United States Patent [19]
Kohler et al.

[11] Patent Number: 5,556,818
[45] Date of Patent: Sep. 17, 1996

[54] SUBSTITUTED BARIUM-NEODYMIUM-TITANIUM-PEROVSKITE, DIELECTRIC, CERAMIC COMPOSITION, CAPACITOR AND MICROWAVE COMPONENTS

[75] Inventors: Heinz Kohler, Aachen; Dieter Mateika, Ellerbek, both of Germany; Sietse Oostra, Roermond, Netherlands

[73] Assignee: U.S. Philips Corporation, New York, N.Y.

[21] Appl. No.: 316,273

[22] Filed: Sep. 30, 1994

[51] Int. Cl.$^6$ .................................................. C04B 35/46
[52] U.S. Cl. ........................................... 501/138; 501/139
[58] Field of Search ...................................... 501/138, 139

[56] References Cited

U.S. PATENT DOCUMENTS

| | | | |
|---|---|---|---|
| 5,314,651 | 5/1994 | Kulwicki | 501/138 |
| 5,376,603 | 12/1994 | Hirahara et al. | 501/138 |

FOREIGN PATENT DOCUMENTS

| | | | |
|---|---|---|---|
| 62-17069 | 1/1987 | Japan | C04B 35/46 |
| 62-184705 | 8/1987 | Japan | C04B 35/46 |
| 63-79753 | 4/1988 | Japan | C04B 35/46 |
| 2-267163 | 10/1990 | Japan | C04B 35/46 |

OTHER PUBLICATIONS

CA 105:182190, Shaikh et al, 1986 (no month avail.).
W. Baumgart et al, "Process Mineralogy of Ceramic Materials", Ferdinand Enke Publishers Stuttgart, (1984) no month avail.

*Primary Examiner*—David Brunsman
*Attorney, Agent, or Firm*—Norman N. Spain

[57] ABSTRACT

A substituted barium-neodymium-titanium-perovskite which has a defect structure and which has the following general composition:

$[A'^{m1+}_{a1} A''^{n2+}_{a2} \ldots A^{n}{}^{n^n+}_{an} \blacksquare_{an+1}] [B'^{m1+}_{b1} B''^{m2+}_{b2} \ldots B^{m}{}^{m^n+}_{bm}] O_3$, wherein the cations $A'^{n1+}_{a1} A''^{n2+}_{a2} \ldots A^{n}{}^{n^n+}_{an}$ at least comprise $Ba^{2+}$, $Nd^{3+}$ and, optionally, one or more cations of the group consisting of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Ca^{2+}$, $Ce^{3+}$, $Cd^{2+}$, $Pr^{3+}$, $Sm^{3+}$, $Eu^{3+}$, $Gd^{3+}$, $Th^{4+}$, $Tb^{3+}$, $Mn^{2+}$, $Li^{1+}$, $Dy^{3+}$, $U^{4+}$, $Y^{3+}$, $Fe^{2+}$, $Ho^{3+}$, $Ce^{4+}$, $Co^{2+}$, $Zn^{2+}$, $Er^{3+}$, $Tm^{3+}$, $Yb^{3+}$, and/or $Lu^{3+}$, and the cations $B'^{m1+}_{b1} B''^{m2+}_{b2} \ldots B^{m}{}^{m^n+}_{bm}$ at least comprise titanium $Ti^{4+}$ and, optionally, one or more cations of the group consisting of $Mn^{2+}$, $Cr^{2+}$, $In^{3+}$, $V^{2+}$, $Fe^{2+}$, $Pb^{4+}$, $Li^{1+}$, $Zr^{4+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Sn^{4+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, and/or $Re^{7+}$ and $\blacksquare$ are cation vacancies, and $a_1+a_2+\ldots+a_{n+1}=1$,
$0.17<a_{n+1}<0.30$,
$b_1+b_2+\ldots+b_n=1$ and
$a_1*n^1+a_2*n^2+\ldots+a_n*n^n+b_1*m^1+b_2*m^2+\ldots+b_m*m^m=6$, is an improved dielectric, ceramic material whose dielectric properties can be reliably reproduced and optimized for specific fields of application. A dielectric, ceramic composition comprising said substituted barium-neodymium-titanium-perovskite can suitably be used as the dielectric material in capacitors, for example NPO-capacitors, and microwave components, in particular dielectric resonators.

20 Claims, 3 Drawing Sheets

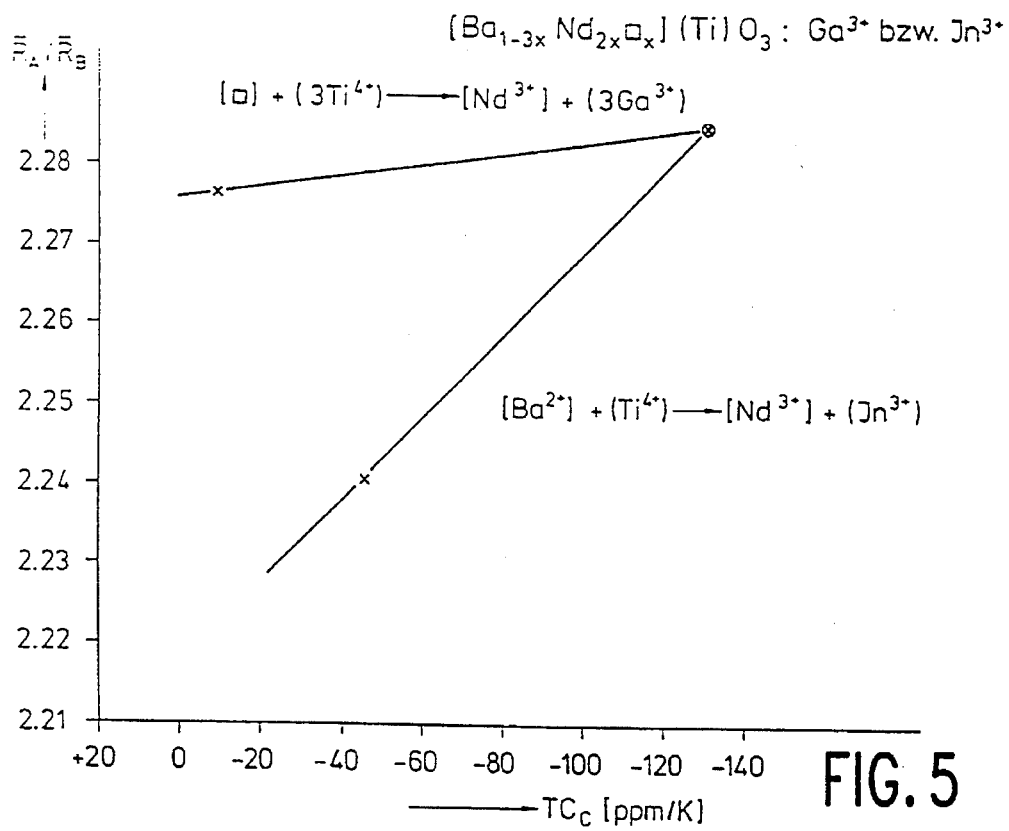
FIG. 5
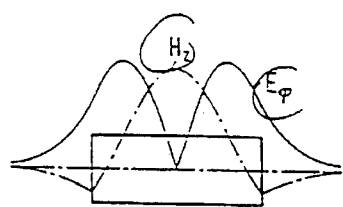
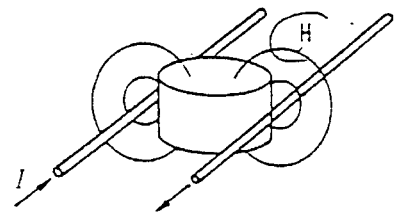
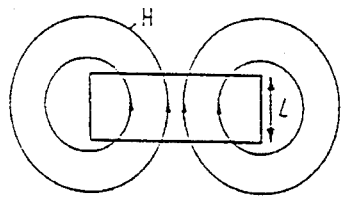
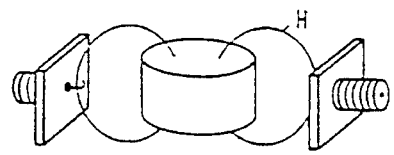
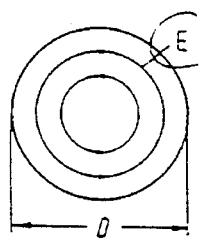
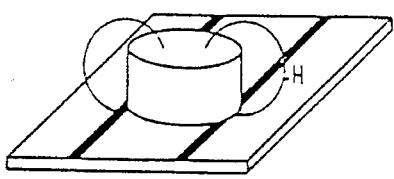
FIG. 6a  FIG. 6b

SUBSTITUTED BARIUM-NEODYMIUM-TITANIUM-PEROVSKITE, DIELECTRIC, CERAMIC COMPOSITION, CAPACITOR AND MICROWAVE COMPONENTS

BACKGROUND OF THE INVENTION

The invention relates to a substituted barium-neodymium-titanium-perovskite, a dielectric, ceramic composition, a capacitor comprising a ceramic dielectric material and a microwave component, in particular a dielectric resonator, comprising a ceramic dielectric material.

The development of dielectric, ceramic materials is of increasing importance to the manufacture of electronic components, because the trend towards miniaturisation of said components is often limited only by the fact that the properties of the materials available are inadequate. Said inadequacies include, for example, the unsatisfactory reproducibility of the properties of dielectric, ceramic materials and the problematic optimization of the relevant parameters for certain fields of application.

The most important fields of application of dielectric, ceramic materials are formed by capacitive elements in electronic circuits, for example for the ceramic dielectric of capacitors and microwave components.

The most important properties for these applications are: a high dielectric constant $\epsilon$, a low dielectric loss factor $\tan \delta$ and a temperature coefficient of the capacitance $TC_c \pm 0$.

Customarily, dielectric ceramic compositions comprising barium oxide, titanium oxide, neodymium oxide as well as further binary oxides are used for these fields of application.

For example, European Patent Application EP 0 473 347 A1 discloses a dielectric ceramic composition which comprises predominantly barium oxide, titanium oxide, neodymium oxide, samarium oxide and bismuth oxide, and which is characterized by the following formula:

$$xBaO\text{—}yTiO2\text{—}z[(1-a-b)Nd_2O_3\text{—}aSm_2O_3\text{—}bBi_2O_3],$$

wherein
$0.10 \leq x \leq 0.20$,
$0.60 \leq y \leq 0.75$,
$0.10 \leq z \leq 0.24$,
$x+y+z=1$;
$0 < a \leq 0.25$ and
$0 < b \leq 0.30$.

In accordance with an embodiment, the dielectric ceramic composition consists predominantly of barium oxide, titanium oxide, neodymium oxide, samarium oxide and bismuth oxide as the main components, and the dielectric ceramic composition is characterized by the following formula:

$$xBaO\text{—}yTiO2\text{—}z[(1-a-b)Nd_2O_3\text{—}aSm_2O_3\text{—}bBi_2O_3],$$ wherein
$0.10 \leq x \leq 0.20$,
$0.60 \leq y \leq 0.75$,
$0.10 \leq z \leq 0.25$,
$x+y+z=1$;
$0 < a \leq 0.30$
$0 < b \leq 0.35$ and
the total quantity of said main components comprises maximally 2.0% by weight of aluminium oxide.

In accordance with the exemplary embodiment, the relevant formulations are compounded and the material is calcinated at 1000° C. and subsequently sintered at 1300° C.–1400° C.

In accordance with these or similar formulations, which are compounded from the starting oxides within very wide concentration ranges, in general a plurality of oxidic phases is formed. This leads to local variations in the microstructure, as a result of which it is very difficult to optimally adjust the properties of the relevant dielectric compositions, and the relevant parameters exhibit a high degree of dispersion when the manufacturing process is not continually accurately controlled.

SUMMARY OF THE INVENTION

For this reason, it is an object of the invention to provide an improved dielectric ceramic material whose dielectric properties can be reproduced in a reliable manner and optimized for specific fields of application.

A further object of the invention is to provide a dielectric, ceramic composition which comprises the above-mentioned material having an improved microstructure and which can be sintered at low temperatures.

This dielectric ceramic composition should enable the manufacture of an NPO capacitor, i.e. a capacitor whose change of the capacitance $TC_c$ between $-55°$ C. and $+125°$ C. varies maximally $+/-30$ ppm/° K. relative to the value measured at 20° C.

In addition, this dielectric ceramic composition should enable the manufacture of a microwave component, in particular a dielectric resonator (DR) which is characterized by a temperature constancy of the resonance frequency.

This object is achieved in accordance with the invention by the preparation of a substituted barium-neodymium-titanium-perovskite which has a defect structure and which has the following general composition:

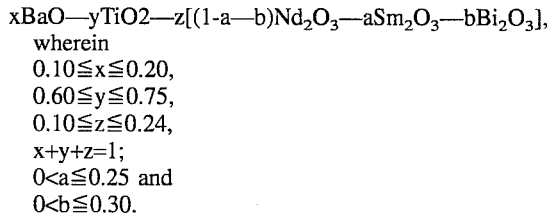

wherein the cations $A'^{n1+}_{a1} A''^{n2+}_{a2} \ldots A^{n_{-}}_{an}$ at least comprise $Ba^{2+}$, $Nd^{3+}$ and, optionally, one or more cations of the group consisting of $Cs^{1+}$, $Rb^{1+}$, $Tl^{1+}$, $K^{1+}$, $Pb^{2+}$, $Ag^{1}$, $Sr^{2+}$, $Na^{1+}$, $Bi^{3+}$, $La^{3+}$, $Ca^{2+}$, $Ce^{3+}$, $Cd^{2+}$, $Pr^{3+}$, $Sm^{3+}$, $Eu^{3+}$, $Gd^{3+}$, $Th^{4+}$, $Tb^{3+}$, $Mn^{2+}$, $Li^{1+}$, $Dy^{3+}$, $U^{4+}$, $Y^{3+}$, $Fe^{2+}$, $Ho^{3+}$, $Ce^{4+}$, $Co^{2+}$, $Zn^{2+}$, $Er^{3+}$, $Tm^{3+}$, $Yb^{3+}$, and/or $Lu^{3+}$, and the cations $B'^{m1+}_{b1} B''^{m2+}_{b2} \ldots B^{m_{-}}_{bm}$ at least comprise titanium and, optionally, one or more cations of the group consisting of $Mn^{2+}$, $Cr^{2+}$, $In^{3+}$, $V^{2+}$, $Fe^{2+}$, $Pb^{4+}$, $Li^{1+}$, $Zr^{4+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Sn^{4+}$, $Ni^{2+}$, $Nb^{4+}$, $Ti^{3+}$, $W^{4+}$, $MO^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, and/or $Re^{7+}$, and ■ are cation vacancies, and $a_1 + a_2 + \ldots + a_{n+1} = 1$,
$0{,}17 < a_{n+1} < 0{,}30$,
$b_1 + b_2 + \ldots + b_n = 1$ and

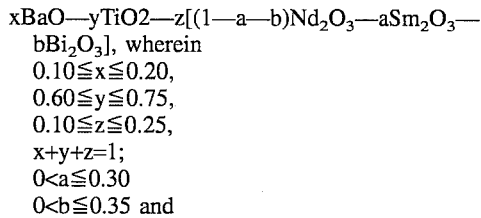

This substituted barium-neodymium-titanium-perovskite which has a defect structure is characterized by very high dielectric constants, low loss angles at medium frequencies and low temperature coefficients of the capacitance $TC_c$.

Within the chemical composition ranges in accordance with the invention, a series of compounds (solid solutions) can be synthesised by controlled mixed-crystal formation, without the formation of foreign phases. Since the properties of the monophase compounds in said series exhibit a simple, partly even linear, relation in accordance with the mixing principle, the dielectric properties can be reproducibly adjusted and optimized in accordance with the requirements (lattice engineering).

In accordance with the invention, preferably, the weighted arithmetic mean of the ion radii of the cations $A'^{n1+}_{a1} A''^{n2+}_{a2} \ldots A'''^{n^n+}_{an}$ is 0.1344 nm$<\bar{r}_a$21 0,1395 nm and the weighted arithmetic mean of the ion radii of the cations $B'^{n1+}_{b1} B''^{n2+}_{b2} \ldots B'''^{n^n+}_{bn}$ is 0,0598 nm$<\bar{r}_b<$0,0620 nm. With these values of the ion radii, the inventive perovskites satisfy the so-called "perovskite condition" $r_A+r_O=t\sqrt{2}(r_B+r_O)$ in an ideal manner, since $0,8<t<1,0$. By virtue thereof, the formation of foreign phases is completely excluded and local variations in the physical properties and increased dielectric losses, caused by said foreign phases, no longer occur.

Further, in the substituted barium-neodymium-titanium-perovskite with defect structure in accordance with the invention the cations $A'^{n1+}_{a1} A''^{n2+}_{a2} \ldots A'''^{n^n+}_{an}$, preferably comprise one or more cations of the group $Ca^{2+}$, $Sr^{2+}$, $Pb^{2+}$, $Gd^{3+}$, $Sm^{3+}$, $Pr^{3+}$, $Bi^{3+}$ and $Na^{1+}$, and the cations $B'^{m1+}_{b1} B''^{m2+}_{b2} \ldots B'''^{m^n+}_{bm}$ preferably comprise one or more cations of the group $Mg^{2+}$, $Nb^{5+}$, $Ta^{5+}$, $In^{3+}$, $Li^{1+}$, $Ga^{3+}$, $Zr^{4+}$, $Ge^{4+}$ and $Hf^{4+}$.

The preferred coordination number of these A-cations with respect to oxygen is the same as that of barium and neodymium, and the preferred coordination number of these B-cations with respect to oxygen is the same as that of titanium. In addition, the above-mentioned radii conditions are also fulfilled. Consequently, in this preferred range mixed-crystal series (solid solutions) are obtained within very wide concentration ranges offering optimum possibilities for "lattice engineering".

In a particularly preferred embodiment of a substituted barium-neodymium-titanium-perovskite having a defect structure, the cations $A'^{n1+}_{a1} A''hd a2^{n2+} \ldots A'''^{n^n+}_{an}$ are $Ba^{2+}$, $Nd^{3+}$ $Ca^{2+}$, $Sr^{2+}$, $Gd^{3+}$ and, optionally, $Bi^{3+}$, and the cations $B'^{m1+}_{b1} B''^{m2+}_{b2} \ldots B'''^{m^n+}_{bm}$ are $Ti^{4+}$ and $Nb^{5+}$.

Another embodiment of the substituted barium-neodymium-titanium-perovskite is characterized in that the cations $A'^{n1+}_{a1} A''^{n2+}_{a2} \ldots A'''^{n^n+}_{an}$ comprise $Li^{1+}$, $Pb^{2+}$ and/or $Bi^{3+}$, and/or the cations $B'^{m1+}_{b1} B''^{m2+}_{b2} \ldots B'''^{m^n+}_{bm}$ comprise $Li^{1+}$.

This composition enables an optimum combination of the values for a NPO capacitor to be found by systematic mixed-crystal formation (lattice engineerint;).

An optimum combination of the values for an NPO capacitor comprises, for example, a substituted barium-neodymium-titanium-perovskite having a defect structure, of the following composition $\{Ba_{0.242}Sr_{0.02}Ca_{0.03}Nd_{0.232}Gd_{0.23}\blacksquare_{0.246}\}[Ti_{0.97}Nb_{0.03}]O_3$.

Another aspect of the invention relates to a dielectric, ceramic composition comprising a substituted barium-neodymium-titanium-perovskite having a defect structure, of the invention and ceramic auxiliary substances.

These ceramic auxiliary substances may be sintering additives, such as MgO, $Y_2O_3$ etc., grain-growth inhibiting agents, such as $TiO_2$, permanent binders or substances which form eutectic systems with the perovskites in accordance with the invention.

Preferably, silicon dioxide is used as the ceramic auxiliary substance. The use of silicon dioxide as the ceramic auxiliary substance allows a lower sintering temperature to be used. By virtue thereof, the firing process is made more economical. Not withstanding the low firing temperature, very fine crystalline perovskites having a homogeneous grain size <1 µm and a density which is approximately 98% of the theoretical density are obtained.

The invention further relates to a capacitor comprising a ceramic dielectric which consists of a dielectric, ceramic composition in accordance with the invention.

This capacitor is characterized in that the dielectric can be thinner and fewer layers are necessary in multilayer capacitors due to the high dielectric constant of the perovskite in accordance with the invention. By virtue thereof, capacitors can be manufactured more economically and, in particular, multilayer capacitors can be manufactured more cheaply because less noble metal is necessary for the inner electrodes.

The invention further relates to a microwave component, in particular a dielectric resonator, comprising a dielectric which has a dielectric ceramic composition in accordance with the invention.

The dielectric, ceramic composition is very suitable for this purpose because it enables a temperature constancy of the resonance frequency of the order of $10^{-6}$/K to be attained. In addition, by virtue of the possibility of "lattice engineering" said composition enables a very accurate frequency tuning to be attained.

BRIEF DESCRIPTION OF THE DRAWING

FIG. 5 is a graph showing the relation between $TC_c$ and $R_A/R_B$ for the mixed-crystal series $[Ba_{1-3x}Nd_{2x}\blacksquare_x](Ti)O_3$: coupled substitutions with $Ga^{3+}$ or $In^{3+}$.

FIG. 6a shows a field distribution and field-line pattern of the $TE_{01\delta}$-mode of a dielectric resonator (DR), shown in FIG. 6b and possibilities of coupling a ceramic cylindrical resonator to the $TE_{01\delta}$-oscillation.

DETAILED DESCRIPTION OF THE PREFERRED EMBODIMENTS

The invention will be explained in greater detail by means of exemplary embodiments and test results and with reference to the accompanying drawings.

The designation "perovskite" is derived from the mineral perovskite and generally refers to compounds of a specific composition and crystal structure which form the basis of an entire industry for electroceramic materials ranging from dielectric materials to high-temperature superconductors.

Figure 1:
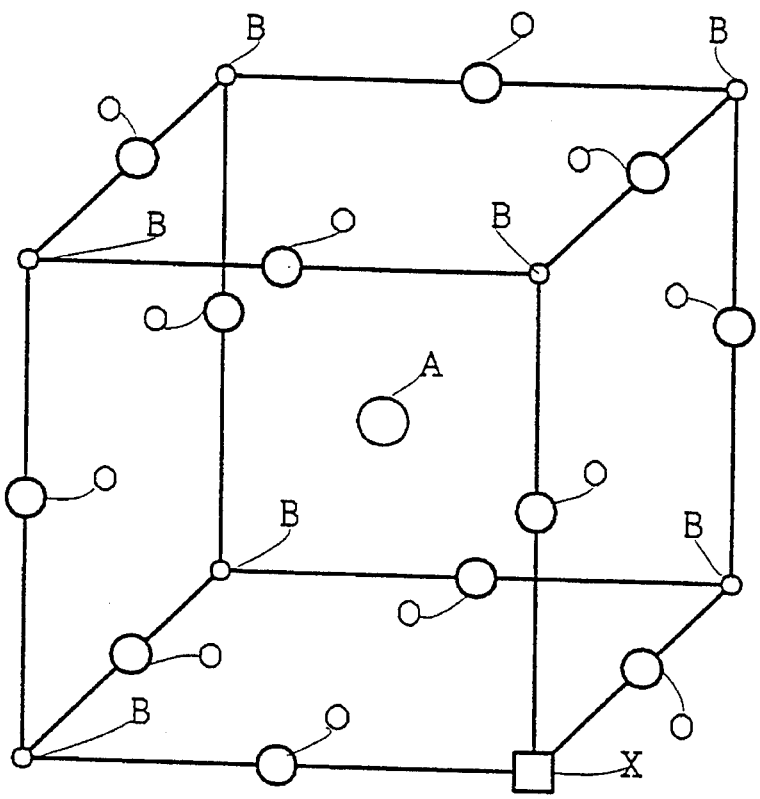
FIG. 1 shows the crystal structure of the inventive perovskite having a defect structure.

The chemical constitution of the ideal perovskite structure can be represented by the general formula $ABX_3$. The perovskite structure, see FIG. 1, is built up of cubes consisting of three chemical elements A, B and X in a ratio of 1:1:3, respectively. The A and B atoms are incorporated as cations, the X atoms, usually oxygen O, as anions. The size of the A cation is always comparable to that of oxygen, whereas the B cation is much smaller. The valency of the individual cations may vary, provided that the sum of the cations is +6, so that they counterbalance the charge of the three oxygen anions.

In the ideal, undistorted perovskite structure the oxygen anions and the A cations form a cubical closest packing. The B cations occupy the octahedral vacancies in the lattice which are formed only by 6 oxygen anions.

Variations in the composition of the perovskites lead to the formation of more or less distorted, perovskite structures whose symmetry is less high.

Variations of the compounds having the perovskite structure are formed in that the A and/or B cations can be partly substituted by one or more other cations, so that the initially ternary perovskites $ABO_3$ are turned into perovskites having more elements, for example quaternary, quinary, senary, septenary, etc. perovskites.

As regards substitution, the perovskite structure is very adaptable, i.e. in the lattice positions of the A cations the perovskite structure may simultaneously contain up to 20 different cations, and in the lattice positions of the B cations it may simultaneously contain up to 40 different cations.

Substitution can take place by partly replacing one cation by another cation of equal valency. However, it is alternatively possible that two or more cations of very different valency replace two or more cations of equal valency. For example, the combination of a divalent cation and a sexivalent cation can replace two tetravalent cations. Examples of such combinations which can replace tetravalent cations are $Ga^{3+}$—$Nb^{5+}$, $Mg^{2+}$—$W^{6+}$, $Mg^{2+}$—$2Nb^{5+}$, etc. Evidently, a plurality of such combinations is possible. Perovskites having cations of different valency in the A-lattice positions or in the B-lattice positions or in both positions are referred to as complex perovskites.

A further substitution method is constituted by coupled substitution in which A cations and B cations are simultaneously substituted by cations of different valency. These substitutions are coupled to one another due to the compulsory balance between the charges. For this reason, this substitution method is referred to as coupled substitution.

The inventive barium-neodymium-titanium-perovskite having a defect structure has a basic structure which is derived from the starting compound $Ba_{1-3x}Nd_{2x}\blacksquare_x TiO_3$, where $0{,}17 \leq x \leq 0{,}30$ and $\blacksquare$=cation vacancies, by substitution. That is, the inventive perovskite has a perovskite-defect structure such that 17–30% of the A lattice positions remain unoccupied. In addition, one cation vacancy $\blacksquare$ in the sublattice of the divalent A cations is associated with two cations which are trivalent instead of divalent.

These associated groups have a dipole moment. When an electric field is applied, the vacancies and the associated cations can easily change their positions. The resulting "Ion Jump Polarization" causes the inventive perovskites to have an extremely high dielectric constant. They also have very high dielectric losses at low frequencies and higher temperatures. At medium frequencies, however, they have very small loss angles.

This basic compound enables the properties of the inventive perovskites to be varied accurately within wide limits by substitution. For this purpose, the three host cations $Ba^{2+}$, $Nd^{3+}$ and $Ti^{4+}$ are partially replaced by guest ions (G).

The guest ions must fulfil certain selection criteria. The most important criterion is the ion radius of the guest ion in relation to the ion radius of the host cation. The ion radius of the guest ion should not deviate more than 30% either way. In the case of a plurality of guest cations, the same applies to the weighted arithmetic mean of their ion radii. The smaller the difference in radii between the host cation and the guest cation, the greater the concentration of the guest cation can be.

A further selection criterion for the guest ions is their preferred coordination number with respect to oxygen, which coordination number should correspond to that of the host cation.

Under these substitution conditions, series of compounds having successively increasing degrees of substitution can be manufactured, which can also be in the form of a mixed crystal or solid solution consisting of the starting compound and final compound of the substitution series.

Since the ion radii of the three host cations differ clearly from each other, i.e. 0.160 nm for $Ba^{2+}$, 0,128 nm for $Nd^{3+}$ and 0,0605 nm for $Ti^{4+}$, simple substitutions in the crystal lattice of the starting compound can be carried out in three different ways, which enable guest ions of different radii to be incorporated. In addition, coupled substitution is alternatively possible.

$Ba^{2+}$-substitution

The host cations which have the largest ion radius are the $Ba^{2+}$ cations. For this reason, also the guest cations G must have a relatively large ion radius.

Possible guest cations are: $Cs^{1+}$, $Rb^{1+}$, $Tl^{1+}$, $K^{1+}$, $Pb^{2+}$, $Ag^1$, $Sr^{2+}$, $Na^{1+}$, $Bi^{3+}$, $La^{3+}$, $Ca^{2+}$, $Ce^{3+}$, $Cd^{2+}$, $Pr^{3+}$, $Nd^{3+}$, and/or $Sm^{3+}$.

As a result of the difference in valency between the guest cations, there are various substitution possibilities. By way of example, a number of substitution possibilities are shown in the following list:

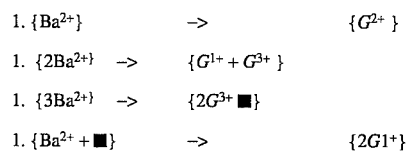

$Nd^{3+}$- substitution

Neodymium has a smaller ion radius than barium and a larger ion radius than titanium. To substitute neodymium cations, use can be made of the following guest cations:

$K^{1+}$, $Ba^{2+}$, $Pb^{2+}$, $Ag^1$, $Sr^{2+}$, $Na^{1+}$, $Bi^{3+}$, $La^{3+}$, $Ca^{2+}$, $Ce^{3+}$, $Cd^{2+}$, $Pr^{3+}$, $Nd^{3+}$, $Sm^{3+}$, $Eu^{3+}$, $Gd^{3+}$, $Th^{4+}$, $Tb^{3+}$, $Mn^{2+}$, $Li^{1+}$, $Dy^{3+}$, $U^{4+}$, $Y^{3+}$, $Fe^{2+}$, $Ho^{3+}$, $Ce^{4+}$, $Co^{2+}$, $Zn^{2+}$, $Er^{3+}$, $Tm^{3+}$, $Yb^{3+}$, and/or $Lu^{3+}$.

Due to the difference in valency between the guest cations, there are several substitution possibilities. A few of said possibilities are shown below:

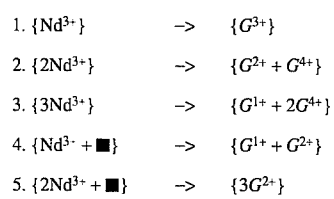

$Ti^{4+}$-substitution

The $Ti^{4+}$ cations are the smallest of the three host cations. The preferred coordination number with respect to oxygen is six. Consequently, for its substitution the following guest cations can be used:

$Mn^{2+}$, $Cr^{2+}$, $In^{3+}$, $V^{2+}$, $Fe^{2+}$, $Pb^{4+}$, $Li^{1+}$, $Zr^{4+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Sn^{4+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, and/or $Re^{7+}$.

Due to the difference in valency between the guest cations, the $Ti^{4+}$ cation can be substituted by a number of substituents, some of which are exemplified below:

1. $\{Ti^{4+}\}$ -> $\{G^{4+}\}$
2. $\{2Ti^{4+}\}$ -> $\{G^{3+} + G^{5+}\}$
3. $\{2Ti^{4+}\}$ -> $\{G^{2+} + G^{6+}\}$
4. $\{3Ti^{4+}\}$ -> $\{G^{2+} + 2G^{5+}\}$
5. $\{4Ti^{4+}\}$ -> $\{G^{1+} + 3G^{5+}\}$

Coupled substitution

In the case of coupled substitution, host cations in the A and B lattice positions are simultaneously replaced by guest ions of different valency. This results in the formation of additional dipole moments in the lattice of the inventive perovskites. The two guest cations of different valency are interconnected by an intermediate oxygen anion. This results in an increase of the electrostatic coupling of the cations in the lattice.

A further advantage of coupled substitution is that even cations having ion radii which preclude an optimal fit in the relevant lattice positions can nevertheless fit in the perovskite lattice. Consequently, in this type of substitution many substituents can be used.

The following guest cations can suitably be used for the A lattice position $Cs^{1+}$, $Rb^{1+}$, $Tl^{1+}$, $K^{1+}$, $Pb^{2+}$, $Ag^{1}$, $Sr^{2+}$, $Na^{1+}$, $Bi^{3+}$, $La^{3+}$, $Ca^{2+}$, $Ce^{3+}$, $Cd^{2+}$, $Pr^{3+}$, $Nd^{3+}$, $Sm^{3+}$, $Eu^{3+}$, $Gd^{3+}$, $Th^{4+}$, $Tb^{3+}$, $Mn^{2+}$, $Li^{1+}$, $Dy^{3+}$, $U^{4+}$, $Y^{3+}$, $Fe^{2+}$, $Ho^{3+}$, $Ce^{4+}$, $Co^{2+}$, $Zn^{2+}$, $Er^{3+}$, $Tm^{3+}$, $Yb^{3+}$, and/or $Lu^{3+}$.

The following guest cations can be used for the B lattice position: $Mn^{2+}$, $Cr^{2+}$, $In^{3+}$, $V^{2+}$, $Fe^{2+}$, $Pb^{4+}$, $Li^{1+}$, $Zr^{4+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Sn^{4+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, and/or $Re^{7+}$.

Due to the difference in valency between the guest cations and due to the incorporation of said guest cations in the different lattice positions A and B, the number of substitution schemes is increased considerably. A few examples thereof are listed below:

1. $\{Ba^{2+}\}$ + $[Ti^{4+}]$ -> $\{G^{1+}\}$ + $[G^{5+}]$
2. $\{Nd^{3+}\}$ + $[Ti^{4+}]$ -> $\{G^{2+}\}$ + $[G^{5+}]$
3. $\{Ba^{2+}\}$ + $[Ti^{4+}]$ -> $\{G_1^{3+}\}$ + $[G_2^+]$
4. $\{\blacksquare\}$ + $[2Ti^{4+}]$ -> $\{G^{2+}\}$ + $[2G^{3+}]$
5. $\{\blacksquare\}$ + $[Ti^{4+}]$ -> $\{G_1^{2+}\}$ + $[G_2^{2+}]$
6. $\{\blacksquare\}$ + $[Ti^{4+}]$ -> $\{G1+\}$ + $[G^{3+}]$
7. $\{3\blacksquare\}$ + $[2Ti^{4+}]$ -> $\{3G2+\}$ + $[2G^{1+}]$
8. $\{2Nd^{3+}\}$ + $[Ti^{4+}]$ -> $\{2G^{2+}\}$ + $[G^{6+}]$
9. $\{Ba^{2+}\}$ + $[Ti^{4+}]$ -> $\{2G^{3+}\}$ + $[G^{2+}]$
10. $\{Nd^{3+}\}$ + $[3Ti^{4+}]$ -> $\{\blacksquare\}$ + $[3G^{5+}]$
11. $\{3Ba^{2+}\}$ + $[Ti^{4+}]$ -> $\{3G^{3+}\}$ + $[G^{1+}]$
12. $\{\blacksquare\}$ + $[3Ti^{4+}]$ -> $\{G_1^{3+}\}$ + $[3G_2^{3+}]$
13. $\{2\blacksquare\}$ + $[3Ti^{4+}]$ -> $\{2G^{3+}\}$ + $[3G^{2+}]$ Continuous mixed crystal series are compounded to optimize the dielectric properties. This mixed crystal series exhibit a simple relation to the degree of substitution, while the temperature coefficient $TC_c$ even exhibits a linear relation, to the degree of substitution.

Figure 2:
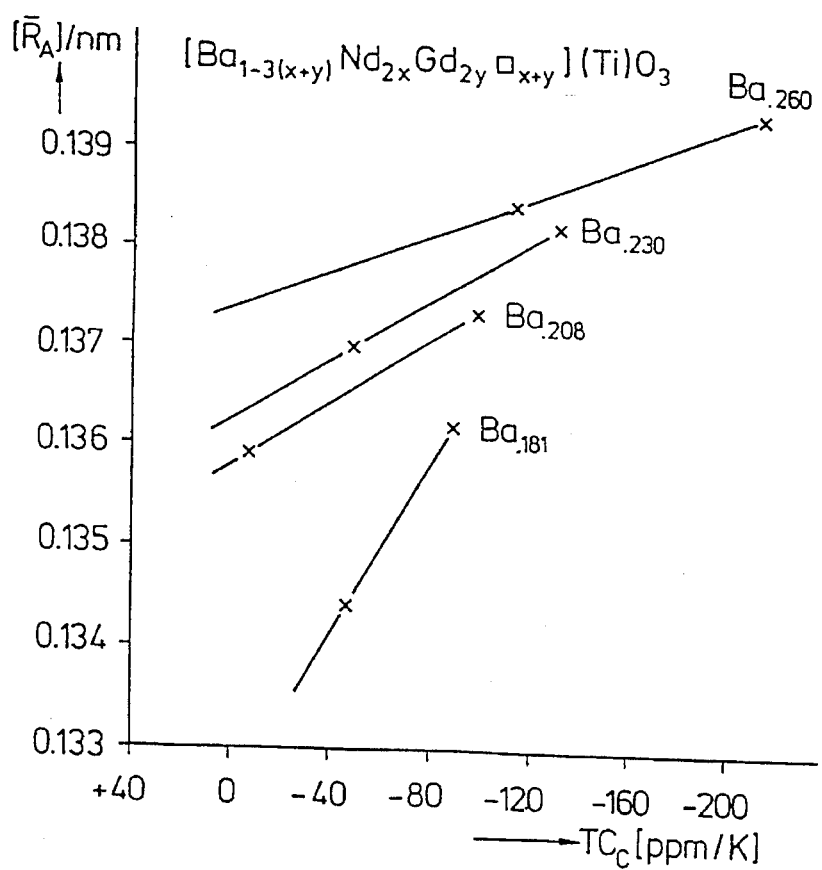
FIG. 2 is a graph showing the relation between $TC_c$ and $R_A$ for the mixed-crystal series 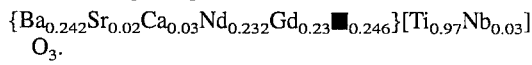$(Ti)O_3$.
Figure 3:
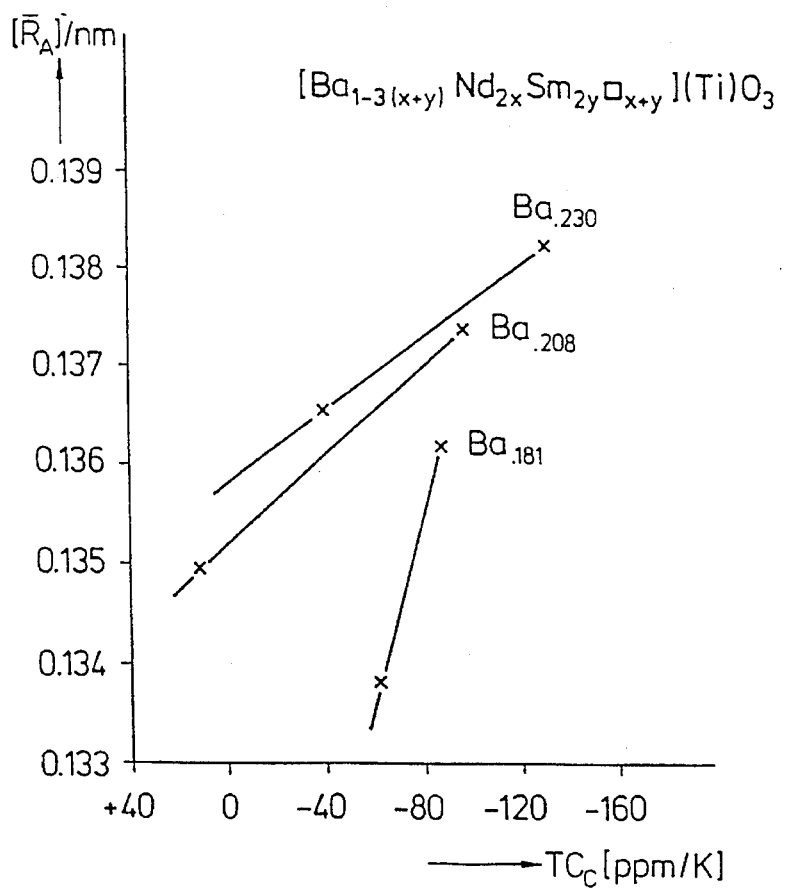
FIG. 3 shows the relation between $TC_c$ and $R_A$ for the mixed-crystal series $[Ba_{1-3(x+y)}Nd_{2x}Sm_{2y}\blacksquare_{x+y}](Ti)O_3$.
Figure 4:
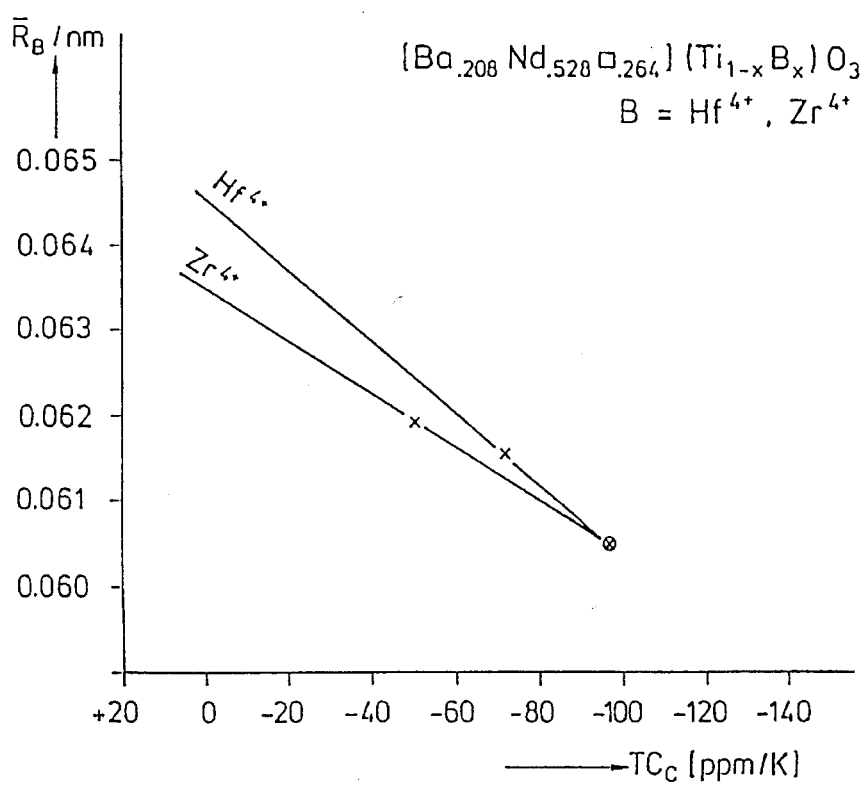
FIG. 4 is a graph showing the relation between $TC_c$ and $R_B$ for the mixed-crystal series $[Ba_{0.208}Nd_{0.528}\blacksquare_{0.264}](Ti_{1-x}B_x)O_3$.

For monosubstitutions, it suffices to plot the concentration of the guest cation versus the dielectric parameters. In the case of complex substitutions, however, it has been found to be very advantageous to use the weighted arithmetic mean of all A cations or B cations as the basis. Such linear relations are shown in FIGS. 2 to 4.

In the case of coupled substitutions it has surprisingly been found that if the ratio $R_A/R_B$ of the weighted arithmetic mean values of the A cations and B cations is used as the basis, linear relations are found. Such a relation is shown in FIG. 5.

The perovskites in accordance with the invention are usually used as sintered, ceramic moulded bodies.

The manufacturing process of these moulded bodies comprises the following steps:

the manufacture of the inventive perovskites in powdered form, moulding, drying and sintering, final treatment.

For the manufacture of the perovskites in powdered form, use is generally made of the "mixed oxide" technique, i.e. the relevant binary oxides are used as raw materials. If these starting oxides are used as raw materials for electronic ceramics, they must exhibit a very high chemical purity and a uniform, small grain size <1 µm.

The starting oxides are weighed out in accordance with the molar weight ratios, subjected to dry or wet grinding, dried if necessary and calcinated at a temperature in the range from 900° to 1200 °C.

The starting oxide mixtures can, however, also be compounded of the relevant carbonates, alkoxylates and other compounds which can readily be decomposed into oxides without leaving any residues. They can also be obtained by co-precipitation, sol-gel processes or hydrothermal synthesis.

Ceramic auxiliary substances can be added to the material which has already been pre-densified by calcination, and the material thus obtained can be ground again. To mould the powder thus prepared, it is mixed with a binder composition. In addition to the actual binder and a solvent such as water or organic solvents, such compositions generally also comprise plasticizing, deflocculating and wetting agents.

For the moulding operation use is made of the known methods, such as pressing, extruding, casting or film-casting. The green moulded bodies are dried and prefired to remove the components of the binder composition. Subsequently, the product is dense-sintered at temperatures in the range from 1000° C. to 1400° C.

Subsequently, the sintered moulded body can be subjected to mechanical operations.

EXEMPLARY EMBODIMENT

For the starting materials use is made of the oxides or carbonates having an average grain size $d_{50}$ of approximately 0.5 µm. They are weighed out in the molar ratios corresponding to the desired chemical composition. After the oxides or carbonates have been wet-ground in a ball mill and dried in air, the powder is calcinated at 1100° C. Subsequently, the calcinated material is wet-ground using $ZrO_2$ balls, dried and mixed with polyvinyl alcohol as the binding agent. The mixture thus obtained is pressed in known manner to form pellets having a diameter of 6 mm and a thickness of 0.55 mm. These pellets are subsequently sintered at a temperature in the range from 1000° C. to 1400° C.

To determine the dielectric properties, the pellets are coated with CrNi/Au electrodes. The capacitance C or $_AC$ is measured in the temperature range of from −55° to +125° C. The dielectric constant ε and the temperature coefficient of the capacitance $TC_c$ are calculated in known manner from the data obtained. The dielectric losses tg δ are measured at 1 KHz.

Examples of the inventive compositions and their dielectric properties are shown in Tables 1 and 2.

The phase purity of the powders is determined by means of diffractometer recordings and micrographs.

For the manufacture of the capacitor, the ceramic dielectric is provided with electrodes and/or contacts. To form electrodes, the moulded body is provided with a noble metal-containing metallization paste in accordance with the desired electrode pattern. Usually, this paste is already provided on the green moulded body, i.e. before the sintering operation, and the electrodes are burnt in the sintering process. It is alternatively possible, however, to form the electrodes by means of other methods, such as electrodeposition or vacuum evaporation. The contacts are formed by means of the same methods.

For the dielectric resonator as shown in FIG. 6b use is made of a cylindrical resonator whose height L is smaller than its diameter D. It is alternatively possible, however, to use other geometric shapes which are as simple as possible. For the ceramic material use is made of dielectric, ceramic compositions in accordance with the invention having an average dielectric constant of $30<\epsilon_r<200$ and dielectric losses which are as small as possible. When such a dielectric body is subjected to an electromagnetic alternating field of suitable frequency and axial magnetic field strength $H_z$ and tangential electric field strengths $E_\phi$ the step-like change of $\epsilon_r$ causes the formation of a standing wave, i.e. a resonant vibration, at its surface. The quality of the resonator is essentially determined by the dielectric losses of the material.

To preclude radiation of energy, a metallic screen must be provided around the dielectric resonator at some distance. If said screen is provided at a distance of D/2 from the dielectric resonator, the conduction losses are negligibly small.

Electrical leads can simply and effectively be coupled to the $TE_{01\delta}$ oscillation of the dielectric resonator via the magnetic field H. Three possible embodiments are shown in FIG. 6b.

The resonators thus manufactured are used instead of coaxial resonators and cavity resonators in the frequency range $1<f<30$ GHz. By virtue thereof, the dimensions and cost of resonators and components based on said resonators, such as filters and stabilized oscillators, can be reduced considerably. Dielectric resonators can be combined with MIC circuits ("Microwave Integrated Circuit") in a very simple manner.

TABLE 1

Single Substitution

| No. | Composition | Substitution scheme |
|---|---|---|
| 1 | $\{Ba_{1.906}Na_{.02}Nd_{.403}Gd_{.130}\blacksquare_{.2585}\}(Ti)O_3$ | $\{2Ba^{2+}\} \rightarrow (Na^{1+} + Nd^{3+}); \{Nd^{3+}\} \rightarrow \{Gd^{3+}\}$ |
| 2 | $\{Ba_{.181}Ca_{.120}Nd_{.238}Gd_{.236}\blacksquare_{.233}\}(Ti)O_3$ | $\{Nd^{3+}\} \rightarrow \{Gd^{3+}\}$ |
| 3 | $\{Ba_{.181}Ca_{.180}Nd_{.196}Gd_{.230}\blacksquare_{.213}\}(Ti)O_3$ | $\{Nd^{3+}\} \rightarrow \{Gd^{3+}\}$ |
| 4 | $\{Ba_{.208}Nd_{.380}Gd_{.148}\blacksquare_{.264}\}(Ti)O_3$ | $\{Nd^{3+}\} \rightarrow \{Gd^{3+}\}$ |
| 5 | $\{Ba_{.208}Nd_{.143}Sm_{.386}\blacksquare_{.264}\}(Ti)O_3$ | $\{Nd^{3+}\} \rightarrow \{Sm^{3+}\}$ |
| 6 | $\{Ba_{.208}Nd_{.143}Sm_{.386}\blacksquare_{.264}\}(Ti)O_3$ | $\{Nd^{3+}\} \rightarrow \{Sm^{3+}\}$ |
| 7 | $\{Ba_{.188}Sr_{.02}Nd_{.348}Gd_{.18}\blacksquare_{.264}\}(Ti)O_3$ | $\{Ba^{2+} + Nd^{3+}\} \rightarrow \{Sr^{2+} + Gd^{3+}\}$ |
| 8 | $\{Ba_{.208}Nd_{.33}Pr_{.06}Gd_{.148}\blacksquare_{.264}\}(Ti)O_3$ | $\{Nd^{3+}\} \rightarrow \{Pr^{3+} + Gd^{3+}\}$ |

| Nr. | $TC_c$ ppm/K | $\epsilon$ | Tg δ $*10^{-4}$ | $\bar{r}_a$ | $\bar{r}_a/\bar{r}_b$ |
|---|---|---|---|---|---|
| 1 | +2.7 | 75 | 1.4 | 0.1355 | 2.240 |
| 2 | −30 | 86 | 4.0 | 0.1346 | 2.224 |
| 3 | −24 | 87 | 0.5 | 0.1349 | 2.230 |
| 4 | −7 | 83 | 1.0 | 0.1359 | 2.247 |
| 5 | −13 | 81 | 3.3 | 0.1352 | 2.235 |
| 6 | −13 | 81 | 3.3 | 0.1352 | 2.235 |
| 7 | −14 | 79 | 4.0 | 0.1325 | 2.235 |
| 8 | −13 | 81 | 0.8 | 0.1361 | 2.250 |

{ } = A-position, ( ) = B-position, ■ = Cation vacancy
$\bar{r}_a$ = average radius of the cations in the A-position

TABLE 2

Coupled Substitution

| No. | Composition | Substitution Scheme |
|---|---|---|
| 1 | $\{Ba_{.181}Sr_{.12}Ca_{.06}Bi_{.03}Nd_{.156}Gd_{.23}\blacksquare_{.233}\}(Ti_{.96}Nb_{.06})O_3$ | $\{Nd^{3+}\} + (Ti^{4+}) \rightarrow \{Ca^{2+}\} + (Nb^{6+})$ <br> $\{Ba^{2+} + 2Nd^{3+}\} \rightarrow \{Sr^{2+} + Bi^{3+} + Gd^{3+}\}$ |
| 2 | $\{Ba_{.2006}Nd_{.473}Gd_{.080}\blacksquare_{.2485}\}(Ti_{.97}Mg_{.03})O_3$ | $\{2\blacksquare\} + (3Ti^{4+}) \rightarrow (2Nd^{3+}) + (2Mg^{2+})$ |
| 3 | $\{Ba_{.2306}Nd_{.543}\blacksquare_{.2285}\}(Ti_{.91}Ga_{.09})O_3$ | $\{\blacksquare\} + (3Ti^{4+}) \rightarrow \{Nd^{3+}\} + (3Ga^{3+})$ |
| 4 | $\{Ba_{.2006}Nd_{.403}Gd_{.150}\blacksquare_{.2485}\}(Ti_{.98}Li_{0.2})O_3$ | $\{3Ba^{2+}\} + {(Ti^{4+})} \rightarrow \{3Nd^{3+}\} + (Li^{1+})$ |

| No. | $TC_c$ ppm/K | $\epsilon$ | Tg δ $*10^{-4}$ | $\bar{r}_a$ nm | $\bar{r}_b$ nm | $\bar{r}_a/\bar{r}_b$ |
|---|---|---|---|---|---|---|
| 1 | −1 | 97 | 0.1 | 0.1370 | 0.0606 | 2.240 |
| 2 | −21 | 69 | 2.2 | 0.1360 | 0.0608 | 2.237 |

TABLE 2-continued

| Coupled Substitution | | | | | | |
|---|---|---|---|---|---|---|
| 3 | −9 | 68 | 1.3 | 0.1378 | 0.0606 | 2.278 |
| 4 | 0 | 75 | 0,5 | 0.1354 | 0.0608 | 2.226 |

{ } = A-Position, ( ) = B-Position, ■ = Cation vacancy
$\bar{r}_a$ $\bar{r}_b$ = average radius of the cations in the A- or B-Position

We claim

1. A substituted barium-neodymium-titanium-perovskite which has a defect structure and which has the following general composition:

$[A'^{n1+}_{a1} A''^{n2+}_{a2} \ldots A'''^{n^n+}_{an} \blacksquare_{an+1}] [B'^{m1+}_{b1} B''^{m2+}_{b2} \ldots B'''^{m^m+}_{bm}] O_3$, wherein the cations $A'^{a1+}_{a1} A''^{a2+}_{a2} \ldots A'''^{n^n+}_{an}$ at least comprise $Ba^{2+}$, $Nd^{3+}$ and, optionally, one or more cations of the group consisting of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Ca^{2+}$, $Ce^{3+}$, $Cd^{2+}$, $Pr^{3+}$, $Sm^{3+}$, $Eu^{3+}$, $Gd^{3+}$, $Th^{4+}$, $Tb^{3+}$, $Mn^{2+}$, $Li^{1+}$, $Dy^{3+}$, $U^{4+}$, $Y^{3+}$, $Fe^{2+}$, $Ho^{3+}$, $Ce^{4+}$, $Co^{2+}$, $Zn^{2+}$, $Er^{3+}$, $Tm^{3+}$, $Yb^{3+}$, and/or $Lu^{3+}$, and the cations $B'^{m1+}_{b1} B''^{m2+}_{b2} \ldots B'''^{m^n+}_{bm}$ at least comprise titanium $Ti^{4+}$ and, optionally, one or more cations of the group consisting of $Mn^{2+}$, $Cr^{2+}$, $In^{3+}$, $V^{2+}$, $Fe^{2+}$, $Pb^{4+}$, $Li^{1+}$, $Zr^{4+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Sn^{4+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, and/or $Re^{7+}$, and ■ are cation vacancies, and $a_1 + a_2 + \ldots + a_{n+1} = 1$,
$0.17 < a_{n+1} < 0.30$,
$b_1 + b_2 + \ldots + b_n = 1$ and
$a_1 * n^1 + a_2 * n^2 + \ldots + a_n * n^n + b_1 * m^1 + b_2 * m^2 + \ldots + b_m * m^m = 6$.

2. A substituted barium-neodymium-titanium-perovskite as claimed in claim 1, characterized in that for the cations $A'^{n1+}_{a1} A''^{n2+}_{a2} \ldots A'''^{n^n+}_{an}$ the weighted arithmetic mean of the ion radii is 0.1345 nm $< \bar{r}_a <$ 0.1395 nm and for the cations $B'^{n1+}_{b1} B''^{n2+}_{b2} \ldots B'''^{n^n+}_{bn}$ the weighted arithmetic mean of the ion radii is 0,0598 nm $< \bar{r}_b <$ 0,0620 nm.

3. A substituted barium-neodymium-titanium-perovskite as claimed in claim 2, characterized in that the cations $A'^{n1+}_{a1} A''^{n2+}_{a2} \ldots A'''^{n^+}_{an}$ comprise one or more cations of the group $Ca^{2+}$, $Sr^{2+}$, $Pb^{2+}$, $Gd^{3+}$, $Sm^{3+}$, $Pr^{3+}$, $Bi^{3+}$, and $Na^{1+}$, and in that the cations $B'^{m1+}_{b1} B''^{m2+}_{b2} \ldots B'''^{m+}_{bm}$ comprise one or more cations of the group $Mg^{2+}$, $Nb^{5+}$, $Ta^{5+}$, $In^{3+}$, $Li^{1+}$, $Ga^{3+}$, $Zr^{4+}$, $Ge^{4+}$ and $Hf^{4+}$.

4. A substituted barium-neodymium-titanium-perovskite as claimed in claim 2, characterized in that the cations $A'^{n1+}_{a1} A''^{n2+}_{a2} 0 \ldots A'''^{n+}_{an}$ are $Ba^{2+}$, $Nd^{3+}$, $Ca^{2+}$, $Sr^{2+}$, $Gd^{3+}$ and optionally $Bi^{3+}$ and in that the cations $B'^{m1+}_{b1} B''^{m2+}_{b2} \ldots B'''^{m+}_{bm}$ are $Ti^{4+}$ $Nb^{5+}$.

5. A substituted barium-neodymium-titanium-perovskite as claimed in claim 2, characterized in that the cations $A'^{n1+}_{a1} A''^{n2+}_{a2} \ldots A'''^{n+}_{an}$ comprise $Li^{1+}$, $Pb^{2+}$ and/or $Bi^{3+}$ and/or the cations $B'^{m1+}_{b1} B''^{m2+}_{b2} \ldots B'''^{m+}_{bm}$ comprise $Li^{1+}$.

6. A substituted barium-neodymium-titanium-perovskite as claimed in claim 2, characterized in that said perovskite has the chemical composition:

$\{Ba_{0.242}Sr_{0.02}Ca_{0.03}Nd_{0.232}Gd_{0.23}\blacksquare_{0.246}\}[Ti_{0.97}Nb_{0.03}] O_3$.

7. A dielectric, ceramic composition, characterized in that it comprises a substituted barium-neodymium-titanium-perovskite having a defect structure as claimed in claim 2 and ceramic auxiliary substances.

8. A substituted barium-neodymium-titanium-perovskite as claimed in claim 1, characterized in that the cations $A'^{n1+}_{a1} A''^{n2+}_{a2} \ldots A'''^{n^n+}_{an}$ comprise one or more cations of the group $Ca^{2+}$, $Sr^{2+}$, $Pb^{2+}$, $Gd^{3+}$, $Sm^{3+}$, $Pr^{3+}$, $Bi^{3+}$ and $Na^{1+}$, and in that the cations $B'^{m1+}_{b1} B''^{m2+}_{b2} \ldots B'''^{m^n+}_{bm}$ comprise one or more cations of the group $Mg^{2+}$, $Nb^{5+}$, $Ta^{5+}$, $In^{3+}$, $Li^{1+}$, $Ga^{3+}$, $Zr^{4+}$, $Ge^{4+}$ and $Hf^{4+}$.

9. A substituted barium-neodymium-titanium-perovskite as claimed $A''^{n2+}_{a2} \ldots A'''^{n}_{an}$ are $Ba^{2+}$, $Nd^{3+}$, $Ca^{2+}$, $Sr^{2+}$, $Gd^{3+}$ and optionally $Bi^{3+}$ and in that the cations $B'^{m1+}_{b1} B''^{m2+}_{b2} \ldots B'''^{m+}_{bm}$ are $Ti^{4+}$ and $Nb^{5+}$.

10. A substituted barium-neodymium-titanium-perovskite as claimed in claim 8, characterized in that the cations $A'^{n1+}_{a1} A''^{n2+}_{a2} \ldots A'''^{n+}_{an}$ comprise $Li^{1+}$, $Pb^{2+}$ and/or $Bi^{3+}$ and/or the cations $B'^{m1+}_{b1} B''^{m2+}_{b2} \ldots B'''^{m+}_{bm}$ comprise $Li^{1+}$.

11. A substituted barium-neodymium-titanium-perovskite as claimed in claim 8, characterized in that said perovskite has the chemical composition:

$\{Ba_{0.242}Sr_{0.02}Ca_{0.03}Nd_{0.232}Gd_{0.23}\blacksquare_{0.246}\}[Ti_{0.97}Nb_{0.03}] O_3$.

12. A dielectric, ceramic composition, characterized in that it comprises a substituted barium-neodymium-titanium-perovskite having a defect structure as claimed in claim 8 and ceramic auxiliary substances.

13. A substituted barium-neodymium-titanium-perovskite as claimed in claim 1, characterized in that the cations $A'^{m1+}_{a1} A''^{n2+}_{a2} \ldots A'''^{n^n+}_{an}$ are $Ba^{2+}$, $Nd^{3+}$ $Ca^{2+}$, $Sr^{2+}$, $Gd^{3+}$ and optionally $Bi^{3+}$ and in that the cations $B'^{m1+}_{b1} B''^{m2+}_{b2} \ldots B'''^{m+}_{bm}$ are $Ti^{4+}$ and $Nb^{5+}$.

14. A substituted barium-neodymium-titanium-perovskite as claimed in claim 13, characterized in that said perovskite has the chemical composition:

$\{Ba_{0.242}Sr_{0.02}Ca_{0.03}Nd_{0.232}Gd_{0.23}\blacksquare_{0.246}\}[Ti_{0.97}Nb_{0.03}] O_3$.

15. A substituted barium-neodymium-titanium-perovskite as claimed in claim 1, characterized in that the cations $A'^{n1+}_{a1} A''^{n2+}_{a2} \ldots A'''^{n^x+}_{an}$ comprise $Li^{1+}$, $Pb^{2+}$ and/or $Bi^{3+}$ and/or the cations $B'^{m1+}_{b1} B''^{m2+}_{b2} \ldots B'''^{m+}_{bm}$ comprise $Li^{1+}$.

16. A substituted barium-neodymium-titanium-perovskite as claimed in claim 1, characterized in that said perovskite has the chemical composition:

$\{Ba_{0.242}Sr_{0.02}Ca_{0.03}Nd_{0.232}Gd_{0.246}\}[Ti_{0.97}Nb_{0.03}]O_3$.

17. A dielectric, ceramic composition, characterized in that it comprises a substituted barium-neodymium-titanium-perovskite having a defect structure as claimed in claim 1 and ceramic auxiliary substances.

18. A dielectric, ceramic composition as claimed in claim 7, characterized in that the ceramic auxiliary substance is silicon dioxide.

19. A capacitor comprising ceramic dielectric material, characterized in that the dielectric material consists of a dielectric, ceramic composition as claimed in claim 17.

20. A microwave component, in particular a dielectric resonator, comprising a ceramic dielectric material, characterized in that the dielectric material consists of a dielectric, ceramic composition as claimed in claim 17.

* * * * *